(12) United States Patent
Jeon et al.

(10) Patent No.: US 11,351,889 B2
(45) Date of Patent: Jun. 7, 2022

(54) METHOD FOR CONTROLLING FUEL CELL VEHICLE

(71) Applicants: Hyundai Motor Company, Seoul (KR); Kia Motors Corporation, Seoul (KR)

(72) Inventors: Kang Sik Jeon, Gyeonggi-Do (KR); Jae Hun Jang, Jeollanam-do (KR); Jae Young Shim, Gyeonggi-do (KR); Sung Ho Yang, Gyeonggi-do (KR); Young Pin Jin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 216 days.

(21) Appl. No.: 16/886,677

(22) Filed: May 28, 2020

(65) Prior Publication Data

US 2020/0290466 A1 Sep. 17, 2020

Related U.S. Application Data

(62) Division of application No. 15/818,445, filed on Nov. 20, 2017, now Pat. No. 10,703,213.

(30) Foreign Application Priority Data

Jul. 17, 2017 (KR) .......................... 10-2017-0090485

(51) Int. Cl.
*B60L 58/30* (2019.01)
*H01M 8/04298* (2016.01)
(Continued)

(52) U.S. Cl.
CPC ............... *B60L 58/30* (2019.02); *B60L 50/70* (2019.02); *H01M 8/04228* (2016.02);
(Continued)

(58) Field of Classification Search
CPC .... B60L 58/30; B60L 50/70; H01M 8/04228; H01M 8/04291; H01M 8/04298;
(Continued)

(56) References Cited

U.S. PATENT DOCUMENTS 6,632,552 B2 10/2003 Yamanashi
7,285,345 B2 10/2007 Muramoto
(Continued)

FOREIGN PATENT DOCUMENTS

CN 102522582 A 6/2012
CN 102569848 A 7/2012
(Continued)

*Primary Examiner* — Yuen Wong
(74) *Attorney, Agent, or Firm* — Fox Rothschild LLP

(57) ABSTRACT

A method for controlling a fuel cell vehicle is provided. The method includes setting a target purge degree of an anode gas and a target opening degree of an air pressure control valve and determining whether a fuel cell stack is in a power generation stop state. When the fuel cell stack is in the power generation stop state, when the anode gas is purged from the anode based on the target purge degree and the target opening degree, whether hydrogen in the anode gas will flow backwards to a stack enclosure is determined. When the hydrogen flows backwards, at least one of the target purge degree and the target opening degree to a level at which the backflow of the hydrogen is prevented is modified, and the anode gas from the anode based on the modified target purge degree and the modified target opening degree is purged.

7 Claims, 8 Drawing Sheets

(51) Int. Cl.
*H01M 8/04828* (2016.01)
*H01M 8/04303* (2016.01)
*H01M 8/04291* (2016.01)
*H01M 8/04228* (2016.01)
*H01M 8/04492* (2016.01)
*B60L 50/70* (2019.01)

(52) U.S. Cl.
CPC ... *H01M 8/04291* (2013.01); *H01M 8/04298* (2013.01); *H01M 8/04303* (2016.02); *H01M 8/04514* (2013.01); *H01M 8/04843* (2013.01); *H01M 2250/20* (2013.01)

(58) Field of Classification Search
CPC ......... H01M 8/04303; H01M 8/04514; H01M 8/04843; H01M 2250/20; H01M 8/04; H01M 8/04134; H01M 8/04201; H01M 8/04179; Y02E 60/50; Y02T 10/70; Y02T 90/40; Y10S 903/944
See application file for complete search history.

(56) References Cited

U.S. PATENT DOCUMENTS

| | | | |
|---|---|---|---|
| 8,232,013 | B2 | 7/2012 | Igarashi et al. |
| 10,424,798 | B2 | 9/2019 | Jeon et al. |
| 2009/0035624 | A1* | 2/2009 | Kobayashi ................ B01J 7/02 429/416 |
| 2010/0119897 | A1 | 5/2010 | Lin et al. |
| 2012/0148927 | A1 | 6/2012 | Jeon et al. |

FOREIGN PATENT DOCUMENTS

| | | |
|---|---|---|
| CN | 104377376 A | 2/2015 |
| CN | 105186016 A | 12/2015 |
| JP | 2001-0025105 A | 1/2001 |
| JP | 2001-210342 A | 8/2001 |
| JP | 2006-0156141 A | 6/2006 |
| JP | 2008-0130282 A | 6/2008 |
| JP | 2009-0259843 A | 11/2009 |
| JP | 2009-0259844 A | 11/2009 |

\* cited by examiner

METHOD FOR CONTROLLING FUEL CELL VEHICLE

CROSS-REFERENCE TO RELATED APPLICATION

This application a divisional application to U.S. application Ser. No. 15/818,445, filed Nov. 20, 2017, which is based on and claims the benefit of priority to Korean Patent Application No. 10-2017-0090485, filed on Jul. 17, 2017, in the Korean Intellectual Property Office, the disclosure of which is incorporated herein in its entirety by reference.

TECHNICAL FIELD

The present disclosure relates to a method for controlling a fuel cell vehicle, and more particularly, to a method for controlling a fuel cell vehicle in which when hydrogen is purged and condensate is discharged, the hydrogen is prevented from flowing backwards to a stack enclosure.

BACKGROUND

A fuel cell system, which is a main power source for a fuel cell vehicle, is an apparatus that generates electric energy through an oxidation-reduction reaction of hydrogen and oxygen. High purity hydrogen is supplied from a hydrogen storage tank to an anode of a fuel cell stack (hereinafter, referred to as a "stack"), and air in the atmosphere supplied by an air compressor or other air supply devices is introduced into a cathode of the stack.

An oxidation reaction of hydrogen is progressed in the anode to generate hydrogen ions (protons) and electrons, and the generated hydrogen ions and the generated electrons are moved to the cathode through a polymer electrolyte membrane and a separator plate, respectively. Further, a reduction reaction of the hydrogen ions and the electrons moved from the anode and oxygen in the air supplied by an air supply device is progressed in the cathode to generate water and, at the same time, generate electric energy by flow of the electrons.

Meanwhile, to purge hydrogen and discharge condensate, a fuel cell system according to the related art includes a purge valve configured to selectively discharge hydrogen and other gases circulating in the anode to the outside, a water trap in which condensate discharged from an anode is stored, and a condensate valve configured to selectively discharge the condensate stored in the water trap to the outside. The purge valve and the condensate valve are connected to an air discharge line through which humid air discharged from the stack may be discharged to the outside or a humidifier configured to humidify air to be supplied to the stack using the humid air. Accordingly, the hydrogen and other gases discharged from the purge valve and the condensate discharged from the condensate valve may be discharged to the outside along the air discharge line.

However, when the hydrogen and other gases discharged from the purge valve are discharged to the outside along the air discharge line as provided by the related art, a hydrogen concentration of exhaust gas increases, which thus increases a risk of violating a regulation on the hydrogen concentration in the exhaust gas. Further, the hydrogen and other gases circulating in the anode as well as the condensate may be discharged through the condensate valve. Accordingly, when the hydrogen and other gases discharged from the condensate valve are discharged from to the outside along the air discharge line, there is also a risk of violating the above-described regulation on the hydrogen concentration. To prevent such violation of the regulation on the hydrogen concentration, a technique in which hydrogen is purged and condensate is discharged in a state in which an air pressure control valve installed in the air discharge line is closed has been used.

In addition, the air discharge line and the humidifier are connected, through the cathode, to an air supply line configured to supply air to the cathode, and such an air supply line is connected, through a bent tube, to a stack enclosure in which the stack is received. Particularly, the bent tube transfers a negative pressure provided by an air compressor installed in the air supply line to the stack enclosure. Then, leakage gas leaked from the stack and received in the stack enclosure is suctioned by the negative pressure provided by the air compressor, and is then discharged to the outside sequentially via the bent tube, the air supply line, the cathode, the air discharge line, and the like.

When power generation is stopped while the fuel cell system is operated, the air compressor is stopped. Accordingly, when the hydrogen is purged and the condensate is discharged in a state in which the air compressor is stopped, there is a concern in that the hydrogen flows backwards to the stack enclosure along the humidifier, the air discharge line, the cathode, the air supply line, the bent tube, and the like. When the hydrogen flows backwards to the stack enclosure, a hydrogen leak from the stack may be erroneously detected, a hydrogen detection sensor may be damaged, or a safety problem due to hydrogen accumulation may occur. Accordingly, in the related art, a technique in which a check valve or another backflow prevention member is installed in the air discharge line or the like to prevent the hydrogen from flowing backwards to the stack enclosure has been considered. However, in this way, when the backflow prevention member is installed, installation costs of the fuel cell system increase substantially.

SUMMARY

The present disclosure provides a method for controlling a fuel cell vehicle, in which when hydrogen is purged and condensate is discharged, the hydrogen may be prevented from flowing backwards to a stack enclosure.

The present disclosure also provides a method for controlling a fuel cell vehicle, in which when hydrogen is purged and condensate is discharged, whether the hydrogen flows backwards to a stack enclosure may be diagnosed without requiring disassembly and coupling the stack enclosure. The technical objects of the present disclosure are not limited to the above-mentioned one, and the other unmentioned technical objects will become apparent to those skilled in the art from the following description.

In accordance with an aspect of the present disclosure, a method for controlling a fuel cell vehicle having a purge valve installed in a purge line through which an anode gas circulating in an anode is transferred to an air discharge line through which humid air discharged from a cathode is discharged to the outside, and an air pressure control valve installed in the air discharge line according to an exemplary embodiment of the present disclosure may include setting a target purge degree of the anode gas and a target opening degree of the air pressure control valve, determining whether a fuel cell stack is in a power generation stop state, in response to determining that the fuel cell stack is in the power generation stop state, when the anode gas is purged from the anode based on the target purge degree and the target opening degree, determining whether hydrogen included in the anode gas will flow backwards to a stack enclosure connected to an upstream side of the air discharge line, and in response to determining that the hydrogen flows backwards, modifying at least one of the target purge degree and the target opening degree to a level at which the backflow of the hydrogen is prevented, and purging the anode gas from the anode based on the modified target purge degree and the modified target opening degree.

The determination of whether hydrogen included in the anode gas will flow backwards to a stack enclosure may be performed using a backflow diagram that indicates a correlation of the target purge degree, the target opening degree, and the backflow of the hydrogen. When the anode gas is purged by a specific purge degree between a predetermined minimum purge degree and a predetermined maximum purge degree, a particular opening degree of the air pressure control valve, which corresponds to the minimum value at which the backflow of the hydrogen is prevented, may be recorded at the specific purge degree in the backflow diagram. Additionally, in the determination of whether hydrogen included in the anode gas will flow backwards to a stack enclosure, when the target purge degree and the target opening degree are located in a predetermined backflow area as a result of analyzing the target purge degree and the target opening degree using the backflow diagram, the hydrogen may be determined to be flowing backwards.

Further, in the determination of whether a fuel cell stack is in a power generate stop state, at least one of the target purge degree and the target opening degree may be modified to adjust the target purge degree and the target opening degree to be in a predetermined non-backflow area based on the backflow diagram. The determination of whether a fuel cell stack is in a power generate stop state may include determining whether the fuel cell vehicle is driven on a downhill road, in response to determining that the fuel cell vehicle is not driven on a downhill road, deriving the specific opening degree that corresponds to the target purge degree by inserting the target purge degree to the backflow diagram as the specific purge degree, and then setting the derived specific opening degree as a modified target opening degree, and purging the anode gas from the anode based on the target purge degree and the modified target opening degree.

Additionally, the determination of whether a fuel cell stack is in a power generate stop state may further include in response that the fuel cell vehicle is driven on a downhill road, deriving the specific purge degree that corresponds to the target opening degree by inserting the target opening degree to the backflow diagram as the particular opening degree, and then setting the derived specific purge degree as a modified target purge degree, and purging the anode gas from the anode by the modified target purge degree based on the modified target purge degree and the target opening degree. The determination of whether a fuel cell stack is in a power generate stop state may further include purging the anode gas from the anode again by a residual degree corresponding to a difference between the target purge degree and the modified target purge degree. The last purging may be performed after a predetermined reference time period elapses from the previous purging process.

In accordance with another aspect of the present disclosure, a method for controlling a fuel cell vehicle including a condensate valve installed in a condensate discharge line through which condensate stored in a water trap is transferred to an air discharge line through which humid air discharged from a cathode is discharged to the outside, and an air pressure control valve installed in the air discharge line according to another exemplary embodiment of the present disclosure may include setting a target discharge degree of the condensate and a target opening degree of the air pressure control valve, determining whether a fuel cell stack is in a power generation stop state, in response to determining that the fuel cell stack is in the power generation stop state, when the condensate is discharged from the water trap based on the target discharge degree and the target opening degree, determining whether hydrogen transferred to the air discharge line flows backwards to a stack enclosure connected to an upstream side of the air discharge line, and in response to determining that the hydrogen flows backwards, modifying at least one of the target discharge degree and the target opening degree to a level at which the backflow of the hydrogen is prevented, and discharging the condensate from the water trap based on the target discharge degree and the target opening degree.

In particular, the determination of whether hydrogen transferred to the air discharge line flows backwards to a stack enclosure may be performed using a backflow diagram indicating a correlation of the target discharge degree, the target opening degree, and the backflow of the hydrogen. When the condensate is discharged by a specific discharge degree between a predetermined minimum discharge degree and a predetermined maximum discharge degree, a particular opening degree of the air pressure control valve, which corresponds to a minimum value at which the backflow of the hydrogen is prevented, may be recorded at the specific discharge degree in the backflow diagram, and in e determination of whether hydrogen transferred to the air discharge line flows backwards to a stack enclosure, when the target discharge degree and the target opening degree are located in a predetermined backflow area as a result of analyzing the target discharge degree and the target opening degree using the backflow diagram, the hydrogen may be determined to be flowing backwards.

In addition, in the modification of at least one of the target discharge degree and the target opening degree, at least one of the target discharge degree and the target opening degree may be modified to adjust the target discharge degree and the target opening degree to be in a predetermined non-backflow area based on the backflow diagram. This process may also include determining whether the fuel cell vehicle is driven on a downhill road, in response to determining that the fuel cell vehicle is not driven on a downhill road, deriving the specific opening degree that corresponds to the target discharge degree by inserting the target discharge degree to the backflow diagram as the specific discharge degree, and then setting the derived specific opening degree as a modified target opening degree, and discharging the condensate from the water trap based on the target discharge degree and the modified target opening degree.

The modification of at least one of the target discharge degree and the target opening degree may further include in response to determining that the fuel cell vehicle is driven on a downhill road, deriving the specific discharge degree that corresponds to the target opening degree by inserting the target opening degree to the backflow diagram as the specific opening degree, and then setting the derived specific discharge degree as a modified target discharge degree, and discharging the condensate from the water trap by the modified target discharge degree based on the modified target discharge degree and the target opening degree.

Additionally, the modification of at least one of the target discharge degree and the target opening degree may include determining whether a water level of the water trap exceeds a predetermined reference water level (e.g., performed after the discharging of the condensate), in response to determining that the water level of the water trap exceeds the reference water level, immediately discharging the condensate again by a residual degree that corresponds to a difference between the target discharge degree and the modified target discharge degree, and in response to determining that the water level of the water trap is less than the reference water level, after waiting for a predetermined reference time period, discharging the condensate from the water trap again by the residual degree.

In accordance with an aspect of the present disclosure, a method for controlling a fuel cell vehicle that includes a purge valve installed in a purge line through which an anode gas circulating in an anode is transferred to an air discharge line through which humid air discharged from a cathode is discharged to the outside, a condensate valve installed in a condensate discharge line through which condensate stored in a water trap is transferred to the air discharge line, and an air pressure control valve installed in the air discharge line according to yet another exemplary embodiment of the present disclosure may include setting a target purge degree of the anode gas, a target discharge degree of the condensate, and a target opening degree of the air pressure control valve, determining whether a fuel cell stack is in a power generation stop state, in response to determining that the fuel cell stack is in the power generation stop state, when the anode gas is purged from the anode, and at the same time, the condensate may be discharged from the water trap based on the target purge degree, the target discharge degree, and the target opening degree, determining whether hydrogen transferred to the air discharge line flows backwards to a stack enclosure connected to an upstream side of the air discharge line, and in response to determining that the hydrogen flows backwards, modifying at least one of the target purge degree, the target discharge degree, and the target opening degree to a level at which the backflow of the hydrogen is prevented, and purging the anode gas from the anode, and at the same time, discharging the condensate from the water trap based on the target purge degree, the target discharge degree, and the target opening degree.

The determining of whether hydrogen transferred to the air discharge line flows backwards to a stack enclosure may be performed by using a backflow diagram that indicates a correlation of the target purge degree, the target discharge degree, and the backflow of the hydrogen. When the anode gas is purged by a particular purge degree between a predetermined minimum purge degree and a predetermined maximum purge degree, a first particular opening degree of the air pressure control valve, which corresponds to a minimum value at which the backflow of the hydrogen is prevented, may be recorded at the particular purge degree in the backflow diagram, when the condensate is discharged by a particular discharge degree between a predetermined minimum discharge degree and a predetermined maximum discharge degree, a second particular opening degree of the air pressure control valve, which corresponds to a minimum value at which the backflow of the hydrogen is prevented, may be recorded at the particular discharge degree in the backflow diagram. Additionally, in the determination of whether hydrogen transferred to the air discharge line flows backwards to a stack enclosure, when the target purge degree, the target discharge degree, and the target opening degree are in a predetermined backflow area (e.g., the degrees are within a particular range that causes backflow) as a result of analyzing the target discharge degree and the target opening degree using the backflow diagram, the hydrogen may be determined to be flowing backwards.

At least one of the target purge degree, the target discharge degree, and the target opening degree may be modified to be in a predetermined non-backflow area based on the backflow diagram. The modification process of the degrees may include determining whether the fuel cell vehicle is driven on a downhill road, in response to determining that the fuel cell vehicle is not driven on a downhill road, modifying the target opening degree to a level at which the backflow of the hydrogen is prevented, and setting the modified target opening degree as a modified target opening degree, and purging the anode gas from the anode by the target purge degree, and at the same time, discharging the condensate from the water trap by the target discharge degree based on the target purge degree, the target discharge degree and the modified target opening degree.

In particular, this process may further include in response to determining that the fuel cell vehicle is driven on a downhill road, modifying the target purge degree and the target discharge degree to a level at which the backflow of the hydrogen is prevented, and setting the modified target purge degree and the modified target discharge degree as a modified target purge degree and a modified target discharge degree, purging the anode gas from the anode by the modified target purge degree, and at the same time, discharging the condensate from the water trap by the modified target discharge degree based on the modified target purge degree, the modified target discharge degree, and the target opening degree, and purging the anode gas from the anode again by a residual degree that corresponds to a difference between the target purge degree and the modified target purge degree, and at the same time, discharging the condensate from the water trap again by a residual degree that corresponds to a difference between the target discharge degree and the modified target discharge degree, the second purging process being performed after a predetermined time period elapses from the first purging process.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
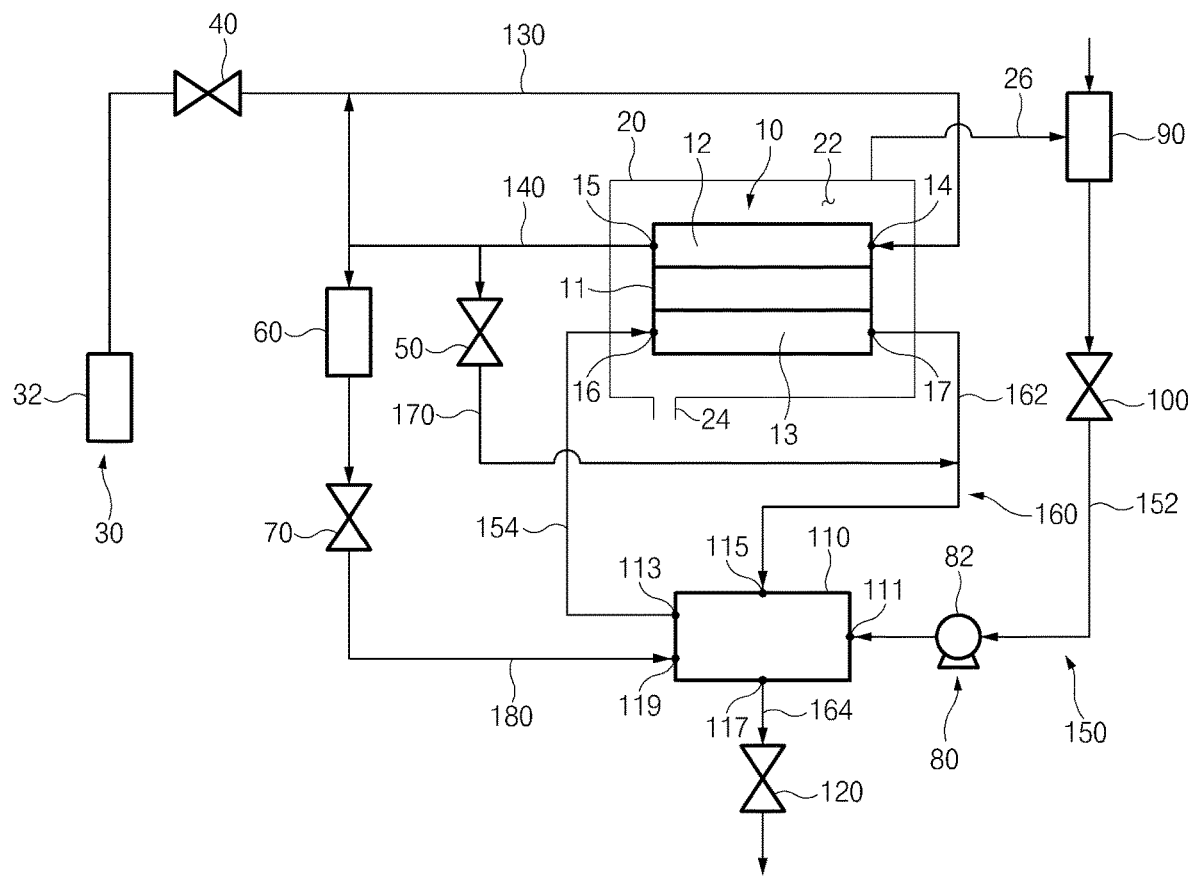
FIG. 1 is a view illustrating a schematic configuration of a fuel cell system according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of exemplary embodiments of the present disclosure, in response to determining that detailed descriptions of well-known configurations or functions disturb understanding of the embodiments of the present disclosure, the detailed descriptions will be omitted.

Also, in the description of the exemplary embodiments of the present disclosure, the terms such as first, second, A, B, (a) and (b) may be used. Each of the terms is merely used to distinguish the corresponding component from other components, and does not delimit an essence, an order or a sequence of the corresponding component. Further, all terms used herein, including technical terms and scientific terms, may have the same meanings as those generally understood by those skilled in the art to which the present disclosure pertains as long as the terms are differently defined. The terms defined in a generally used dictionary should be interpreted to have the same meanings as those in the context of the related art, and are not interpreted as ideal or excessively formal meanings as long as the terms are not clearly defined in the present application.

FIG. 1 is a view illustrating a schematic configuration of a fuel cell system. The present disclosure relates to a method for controlling a fuel cell vehicle, in which when at least one of hydrogen purging and condensate discharging is performed, whether hydrogen flows backwards to an internal space 22 of a stack enclosure 20 and a degree to which the hydrogen flows backwards may be diagnosed. Hereinafter, a schematic configuration of a fuel cell system 1 provided in a fuel cell vehicle to which the present disclosure is applied will be described with reference to FIG. 1.

The fuel cell system 1 may include a fuel cell stack 10 (hereinafter, referred to as a "stack 10"), a stack enclosure 20 in which the stack 10 is received, a hydrogen supply device 30, a hydrogen supply valve 40, a purge valve 50, a water trap 60, a condensate valve 70, an air supply device 80, an air filter 90, an air supply valve 100, a humidifier 110, an air pressure control valve 120, and the like. First, the stack 10 may include a polymer electrolyte membrane 11, an anode 12 in which an oxidation reaction of hydrogen is progressed to generate hydrogen ions and electrons, and a cathode 13 in which a reduction reaction of the hydrogen ions and the electrons moved from the anode 12 and oxygen in the air supplied by an air supply device 80 is progressed to generate electric energy and generated water.

The anode 12 may include a hydrogen inlet 14 which is connected to a hydrogen supply line 130 and into which hydrogen passing through the hydrogen supply line 130 is introduced, and a hydrogen outlet 15 which is connected to a hydrogen recirculation line 140 and from which the hydrogen passing through the anode 12 is discharged. In particular, the hydrogen recirculation line 140 connects the hydrogen outlet 15 and the hydrogen supply line 130 to discharge the hydrogen from the anode 12 through the hydrogen outlet 15 and to transfer the discharged hydrogen to the hydrogen supply line 130 again. Thus, the hydrogen supplied from the hydrogen supply device 30 and the hydrogen recirculated by the hydrogen recirculation line 140 together may be introduced into the hydrogen inlet 14.

The cathode 13 may include an air inlet 16 which is connected to an air supply line 150 and into which air is introduced, and a humid air outlet 17 which is connected to an air discharge line 160 and from which humid air obtained by mixing the air passing through the cathode 13 and the generated water generated in the cathode 13 with each other is discharged. In particular, the air supply line 150 may include a first air supply line 152 that connects the atmosphere and an air inlet 111 of a humidifier 110, and a second air supply line 154 that connects an air outlet 113 of the humidifier 110 and the air inlet 16 of the cathode 13. Further, the air discharge line 160 may include a first air discharge line 162 that connects the humid air outlet 17 of the cathode 13 and a humid air inlet 115 of the humidifier 110, and a second air discharge line 164 that connects a humid air outlet 117 of the humidifier 110 and the outside. Thus, the air humidified by the humidifier 110 and then passing through the second air supply line 154 may be introduced into the air inlet 16, and the humid air may be discharged from the humid air outlet 17 to the first air discharge line 162.

The stack enclosure 20 may also include the internal space 22 formed in an interior thereof into which the stack 10 may be received, a communication aperture 24 that connects the internal space 22 with the atmosphere, and a bent tube 26 that connects the internal space 22 with an air filter 90 which will be described below. The internal space 22 may be formed to receive the stack 10 with a predetermined interval formed between an inner surface of the internal space 22 and an outer surface of the stack 10. Condensate generated on the outer surface of the stack 10, leakage gas leaked from the stack 10, air in the atmosphere introduced into the internal space 22 through the communication aperture 24, and the like may be received in the interval between the inner surface of the internal space 22 and the outer surface of the stack 10.

The communication aperture 24 may be formed through one wall of the stack enclosure 20 to provide communication between the internal space 22 and the atmosphere. The communication aperture 24 may be formed through a lower wall of the stack enclosure 20; however, the present disclosure is not limited thereto. The communication aperture 24 may guide the air in the atmosphere to the internal space 22, and may adjust an internal pressure of the internal space 22 to an atmospheric pressure state. An air filter (not illustrated) that may filter air introduced into the internal space 22 may be installed in the communication aperture 24; however, the present disclosure is not limited thereto.

The bent tube 26 may be installed to communicate the internal space 22 with an inlet of an air compressor 82. For example, as illustrated in FIG. 1, the bent tube 26 may be installed to connect the internal space 22 and the air filter 90 which will be described below. The bent tube 26 may be connected to an upper portion of the internal space 22; however, the present disclosure is not limited thereto. When the air compressor 82 is driven or operated, the negative pressure applied to the air filter 90 may be transferred to the internal space 22 through the bent tube 26. Then, the leakage gas, the condensate, and the air (hereinafter, referred to as "the leakage gas, and the like") received in the internal space 22 may be suctioned through such a negative pressure and thus may be transferred to the air filter 90 through the bent tube 26. Accordingly, the leakage gas, and the like transferred to the air filter 90 may be discharged to the outside sequentially via the air supply line 150, the air compressor 82, the humidifier 110, the air discharge line 160, and the like.

Further, the hydrogen supply device 30 may include a hydrogen storage tank 32 in which hydrogen may be stored. The hydrogen storage tank 32 may be connected to the hydrogen inlet 14 of the anode 12 via the hydrogen supply line 130, and may be configured to supply the hydrogen required for generating electric energy in the stack 10. The hydrogen supplied from the hydrogen storage tank 32 flows along the hydrogen supply line 130, and then may be introduced into the hydrogen inlet 14 of the anode 12.

The hydrogen supply valve 40 may be installed in the hydrogen supply line 130 and may be configured to adjust a supply amount of hydrogen supplied to the anode 12 by adjusting an opening degree of the valve. The purge valve 50 may be configured to discharge the hydrogen passing through the hydrogen recirculation line 140 to the outside. In particular, the hydrogen recirculation line 140 may be connected to the air discharge line 160 via a hydrogen purge line 170, and the purge valve 50 my be installed in the hydrogen purge line 170 to open and close the hydrogen purge line 160. The purge valve 50 may be configured to selectively open the hydrogen purge line 170 when a predetermined hydrogen purge condition is satisfied. The hydrogen purge condition is not particularly limited. For example, the hydrogen purge condition may be whether a hydrogen concentration of the anode 12 is greater than a predetermined reference concentration. When the hydrogen purge line 160 is opened by the purge valve 50, the hydrogen and other gases passing through the hydrogen recirculation line 140 may be transferred to the air discharge line 160 via the hydrogen purge line 170, and may then be discharged to the outside along the air discharge line 160 together with the humid air.

The water trap 60 may be installed in a condensate discharge line 180 connected to the hydrogen recirculation line 140. In particular, the condensate discharge line 180 may be connected to the hydrogen recirculation line 140 at a first end thereof, and may be connected to a condensate inlet 119 of the humidifier 110 at a second end thereof. Thus, the condensate flowing along the hydrogen recirculation line 130 together with the hydrogen may be introduced into the condensate discharge line 170, and may then be stored in the water trap 60.

Further, the condensate valve 70 may be installed in the condensate discharge line 180 to be located downstream of the condensate discharge line 180 as compared with the water trap 60. In particular, the condensate valve 70 may be configured to selectively open and close the condensate discharge line 180 based on a water level of the condensate stored in the water trap 60. When the condensate discharge line 180 is opened by such a condensate valve 70, the condensate stored in the water trap 60 may be transferred to an internal space of the humidifier 110 along the condensate discharge line 170, and may then be water-exchanged with the air transferred to the humidifier 110 along the first air supply line 152.

The air supply device 80 may be installed in the first air supply line 152 and may include the air compressor 82 that may be configured to supply air by pumping the air in the atmosphere. The air supplied by the air compressor 82 may flow along the first air supply line 152, may be humidified by the humidifier 110, may flow along the second air supply line 154, and may then be introduced into the air inlet 16 of the cathode 13. The air filter 90 may be installed in the first air supply line 152 to be located upstream of the first air supply line 152 as compared with the air compressor 82. The air filter 90 may be connected to the internal space 22 of the stack enclosure 20 through the bent tube 26. The air filter 90 may be configured to filter air suctioned from the atmosphere by the negative pressure provided by the air compressor 82, air suctioned from the internal space 22 by the negative pressure provided by the air compressor 82, and the like.

The air supply valve 100 may be installed in the first air supply line 152, and may be configured to adjust a supply amount of air supplied to the cathode 13 by adjusting an opening degree of the valve. The humidifier 110 may be a hollow fiber membrane humidifier which may be configured to humidify air by water-exchanging the air supplied by the air compressor 82 and the humid air discharged from the cathode 13. The humidifier 110 may include the air inlet 111 connected to the first air supply line 152, the air outlet 113 connected to the second air supply line 154, the humid air inlet 115 connected to the first air discharge line 152, the humid air outlet 117 connected to the second air discharge line 154, and the condensate inlet 119 connected to the condensate discharge line 180.

In particular, the humidifier 110 may be configured to humidify the air by water-exchanging the air introduced through the air inlet 111 with the humid air introduced through the humid air inlet 115 and the condensate introduced through the condensate inlet 119, and then discharge the air through the air outlet 113 and discharge the humid air through the humid air outlet 117. The air pressure control valve 120 may be installed in the second air discharge line 154 to regulate discharge pressures of the humid air, the hydrogen, and other gases discharged to the outside through the second air discharge line 154 by adjusting an opening degree of the valve.

Figure 2:
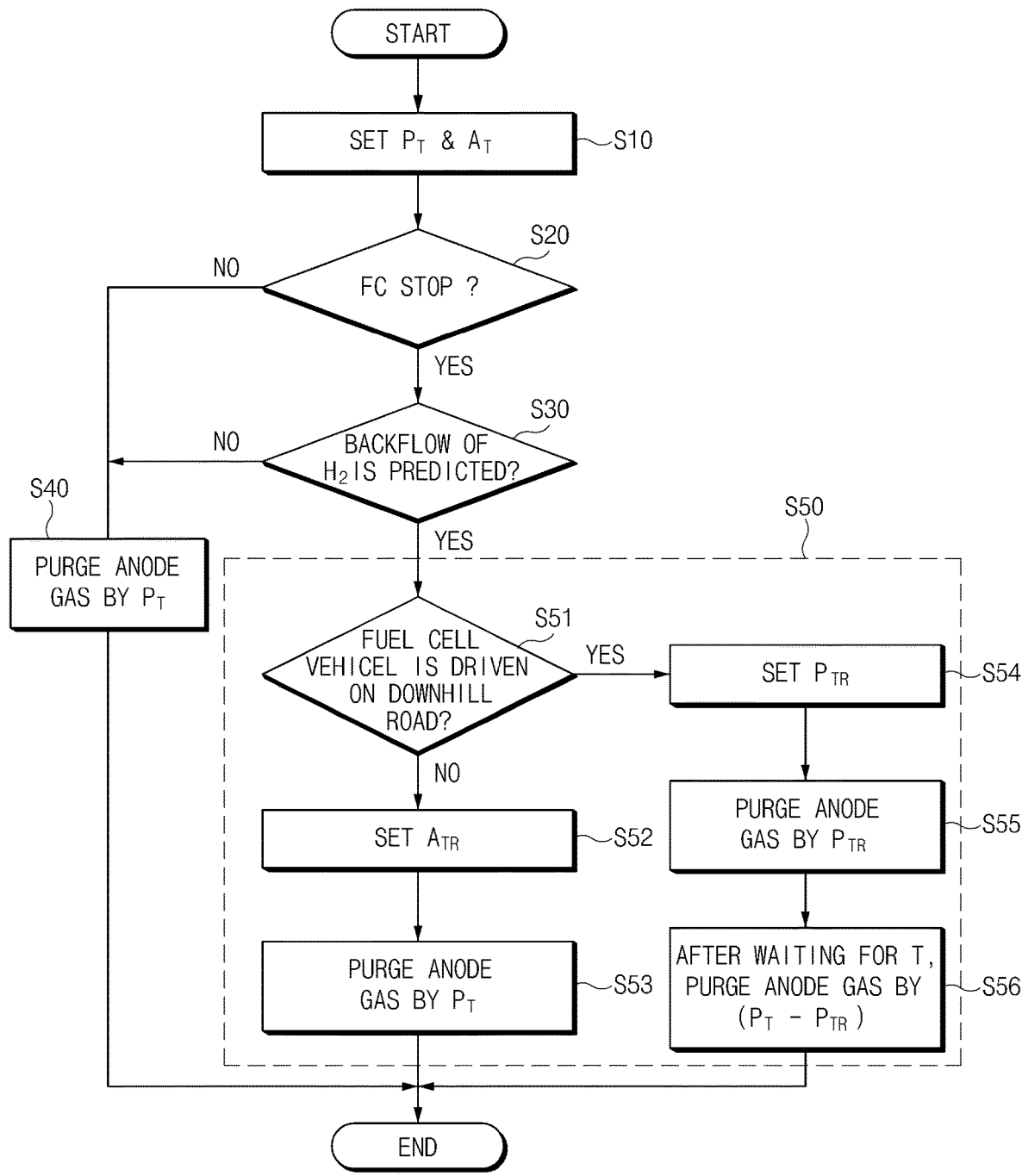
FIG. 2 is a flowchart illustrating a method for controlling a fuel cell vehicle according to a first exemplary embodiment of the present disclosure.
Figure 3:
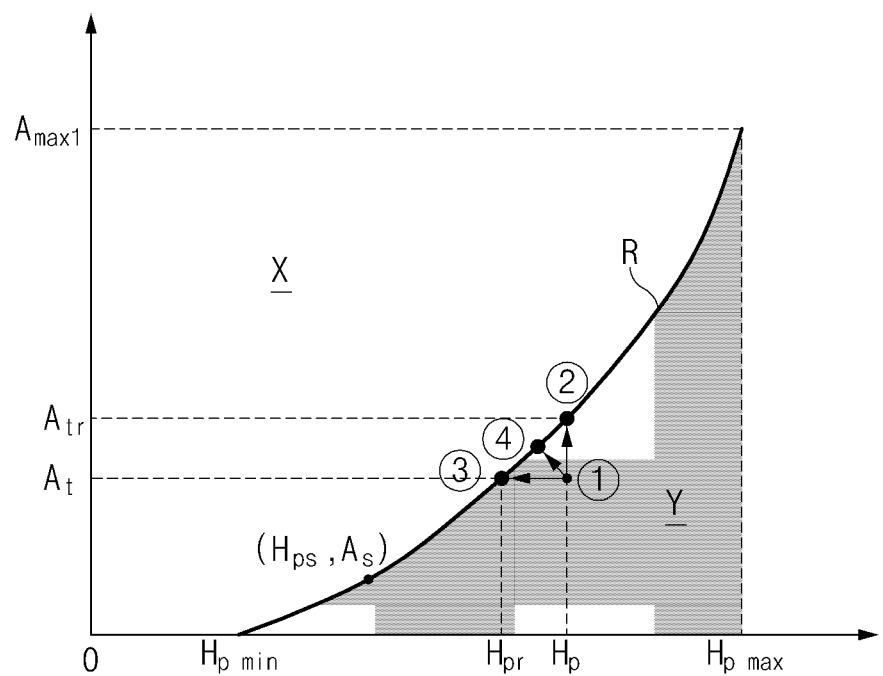
FIG. 3 is a graph illustrating a method for modifying a target purge degree and a target opening degree to prevent hydrogen from flowing backwards according to an exemplary embodiment of the present disclosure.

FIG. 2 is a flowchart illustrating a method for controlling a fuel cell vehicle according to a first exemplary embodiment of the present disclosure, and FIG. 3 is a graph illustrating a method for modifying a target purge degree and a target opening degree to prevent hydrogen from flowing backwards. In a method for controlling a fuel cell vehicle according to the first exemplary embodiment of the present disclosure, when purging of the hydrogen and other gases circulating in the anode 12 (hereinafter, referred to as an "anode gas") is performed in which the anode gas is discharged through the purge valve 50, the hydrogen included in the anode gas discharged through the purge valve 50 may be prevented from flowing backwards to the internal space 22 of the stack enclosure 20. The method to be described herein below may be executed by a controller having a processor and a memory.

For example, referring to FIG. 2, the method for controlling a fuel cell vehicle according to the first exemplary embodiment of the present disclosure may include setting a target purge degree Pt of the anode gas and a target opening degree At of the air pressure control valve 120 (S10); determining whether the stack 10 is in a power generation stop state (S20); in response to determining that the stack is in a power generation stop state, when the anode gas is purged based on the target purge degree Pt and the target opening degree At, determining whether the hydrogen included in the anode gas flows backwards to the stack enclosure 20 connected to an upstream side of the air discharge line 160 (S30); in response to determining that the hydrogen does not flow backwards, purging the anode gas based on the target purge degree Pt and the target opening degree At (S40); and in response to determining that the hydrogen flows backwards, modifying at least one of the target purge degree Pt and the target opening degree At to a level at which backflow of the hydrogen is prevented, and purging the anode gas from the anode 12 based on the modified target purge degree Pt and the modified target opening degree At (S50).

First, in operation S10, the target purge degree Pt of the anode gas and the target opening degree At of the air pressure control valve 120 may be set based on a current state of the fuel cell vehicle. The target purge degree Pt of the anode gas refers to a discharge degree of anode gas to be discharged from the anode 12 through the purge valve 50 among the anode gas circulating in the anode 12. The target purge degree Pt may be determined based on a hydrogen pressure Ah of the anode 12, a hydrogen concentration of the anode 12, and the like. Further, an amount of hydrogen (hereinafter, referred to as a "target hydrogen purge degree Hp") discharged from the anode 12 through the purge valve 50 when the anode gas is purged may be determined based on the target purge degree Pt and the hydrogen pressure Ah as expressed in Equation (1).

$$H_p = f(P_t, A_h) \qquad \text{Equation 1}$$

The target opening degree At of the air pressure control valve 120 refers to an opening degree of the air pressure control valve 120 when the anode gas is purged. The target opening degree At may be determined based on a hydrogen concentration in the vicinity of an outlet of the air discharge line 160, and the like.

In operation S20, whether a power generation stop mode in which supply of the hydrogen to the anode 12 and supply of the air to the cathode 13 are stopped and thus power generation using the stack is stopped is performed may be determined. The power generation stop mode may be performed when the fuel cell vehicle is keyed off, when the fuel cell vehicle starts, when the fuel cell vehicle is driven on a downhill road, and when stop of power generation is required while the fuel cell vehicle is driven. Thereafter, as illustrated in FIG. 3, operation S30 may be performed using a backflow diagram indicating a correlation of the target purge degree Pt, the target opening degree At, and backflow of the hydrogen.

A specific opening degree As of the air pressure control valve 120, which corresponds to a minimum value at which the backflow of the hydrogen may be prevented when the anode gas is purged by a specific purge degree between a predetermined minimum purge degree and a predetermined maximum purge degree of the anode gas, is recorded at the specific purge degree in the backflow diagram illustrated in FIG. 3. For example, as illustrated in FIG. 3, the backflow diagram includes a backflow reference line R that indicates coordinate values of a particular hydrogen purge degree Hps indicating a purge degree of the hydrogen when the anode gas is purged by the specific purge degree and the particular opening degree As of the air pressure control valve 120, which corresponds to a minimum value at which the hydrogen may be prevented from flowing backwards to the internal space 22 of the stack enclosure 20 when the hydrogen is purged by the specific hydrogen purge degree Hps.

A minimum purge degree of the anode gas of the anode 12 refers to a purge degree of the anode gas at which it is determined that the hydrogen does not flow backwards to the internal space 22 of the stack enclosure 20 regardless of an opening degree of the air pressure control valve 120. A "Hpmin" illustrated FIG. 3 refers to a minimum hydrogen purge degree for hydrogen discharged from the anode 12 through the purge valve 50 when the anode gas is purged by such a minimum purge degree.

A maximum purge degree of the anode gas refers to a purge degree of the anode gas, which corresponds to a limit point at which the hydrogen may be prevented from flowing backwards to the internal space 22 of the stack enclosure 20 by adjusting an opening degree of the air pressure control valve 120. When the anode gas is purged by a degree that is greater than the maximum purge degree of the anode gas, the hydrogen flows backwards to the internal space 22 of the stack enclosure 20 regardless of the opening degree of the air pressure control valve 120. A "Hpmax" illustrated FIG. 3 refers to a maximum hydrogen purge degree for hydrogen discharged from the anode 12 through the purge valve 50 when the anode gas is purged by such a maximum purge degree. A "Amax1" illustrated in FIG. 3 refers to a critical opening degree of the air pressure control valve 120, which corresponds to a minimum value at which the hydrogen may be prevented from flowing backwards when hydrogen is discharged from the anode 12 through the purge valve 50 by the maximum hydrogen purge degree Hpmax.

In operation S30, the target purge degree Pt and the target opening degree At are analyzed using such a backflow diagram. For example, when coordinates of the target hydrogen purge degree Hp and the target opening degree At are located on the backflow reference line R or on the left side of the backflow reference line R, it may be interpreted that both the target hydrogen purge degree Hp and the target opening degree At are in proper levels in terms of prevention of the backflow of the hydrogen. Accordingly, when the coordinates of the target hydrogen purge degree Hp and the target opening degree At are located on the backflow reference line R or on the left side of the backflow reference line R, when the anode gas is purged through the purge valve 50 by the target purge degree Pt, and at the same time, the air pressure control valve 120 is opened by the target opening degree At, it may be determined that the hydrogen discharged from the anode 12 through the purge valve 50 does not flow backwards to the internal space 22 of the stack enclosure 20 along the air discharge line 160.

For example, the coordinates of the target hydrogen purge degree Hp and the target opening degree At are located on the right side of the backflow reference line R ①, it may be interpreted that the target hydrogen purge degree Hp is greater than a proper level or the target opening degree At is less than a proper level in terms of the prevention of the backflow of the hydrogen. Accordingly, when the coordinates of the target hydrogen purge degree Hp and the target opening degree At are located on the right side of the backflow reference line R, when the anode gas is purged through the purge valve 50 by the target purge degree Pt, and at the same time, the air pressure control valve 120 is opened by the target opening degree At, it may be determined that the hydrogen discharged from the anode 12 through the purge valve 50 flows backwards to the internal space 22 of the stack enclosure 20 along the air discharge line 160.

For convenience of description, hereinafter, the backflow reference line R and the left side of the backflow reference line R in which it is determined that the hydrogen does not flow backwards when the anode gas is purged may be named a non-backflow area X, and the right side of the backflow reference line R in which it is determined that the hydrogen flows backwards when the anode gas is purged may be named a backflow area Y.

In operation S40, in response to determining in operation S30 that the coordinates of the target hydrogen purge degree Hp and the target opening degree At are located in the non-backflow area X, the anode gas may be purged through the purge valve 50 by the target purge degree Pt, and at the same time, the air pressure control valve 120 may be opened by the target opening degree At. Thereafter, in operation S50, in response to determining in operation S30 that the coordinates of the target hydrogen purge degree Hp and the target opening degree At are located in the backflow area Y ①, at least one of the target purge degree Pt and the target opening degree At may be modified such that the coordinates of the target hydrogen purge degree Hp and the target opening degree At may be located in the non-backflow area X.

For example, operation S50 may include determining whether the fuel cell vehicle is driven on a downhill road (S51); in response to determining that the fuel cell vehicle is not driven on a downhill road, setting a modified target opening degree Atr by modifying the target opening degree At (S52); purging the anode gas from the anode 12 based on the target purge degree Pt and the modified target opening degree Atr (S53); in response to determining that the fuel cell vehicle is driven on a downhill road, setting a modified target purge degree Ptr by modifying the target purge degree Pt (S54); purging the anode gas from the anode 12 by the modified target purge degree Ptr based on the modified target purge degree Ptr and the target opening degree At (S55); and purging the anode gas from the anode 12 again by a residual degree Pt-Ptr that corresponds to a difference between the target purge degree Pt and the modified target purge degree Ptr, operation S56 being performed after a predetermined reference time period T elapses from operation S55 (S56).

In operation S51, whether the fuel cell vehicle is driven on a downhill road may be determined using an inclination sensor provided in the fuel cell vehicle, and the like. Particularly, downhill road driving indicates a state in which the fuel cell vehicle is driven on a downhill road (e.g., downward inclined road surface). When the fuel cell vehicle is driven on a downhill road, driving wind is introduced into the fuel cell stack 10 through the air pressure control valve 120, and thus, a voltage of the stack 10 unintentionally increases. Thus, the stack 10 is dried out or durability of the stack 10 may be adversely affected. To prevent generation of such problems, in operation S51, whether the fuel cell vehicle is driven on a downhill road is determined before the target purge degree Pt and the target opening degree At are modified.

In operation S52, in response to determining in operation S51 that the fuel cell vehicle is not driven on a downhill road (e.g., is driven on a substantially flat road), the target opening degree At may be modified using the backflow diagram illustrated in FIG. 3. In other words, in response to determining that the fuel cell vehicle is not driven on a downhill road, in a state in which the target purge degree Pt remains unchanged, the target opening degree At of the air pressure control valve 120 is modified, and thus, the backflow of the hydrogen may be prevented. The operation S52 may be performed when the fuel cell vehicle is keyed off, when the fuel cell vehicle is stopped, and the fuel cell vehicle is driven in a state other than the downhill road driving.

The method for modifying the target opening degree At using the backflow diagram illustrated in FIG. 3 is not particularly limited. For example, in operation S52, after the specific opening degree As that corresponds to the target hydrogen purge degree Hp is derived by inserting the target hydrogen purge degree Hp to the backflow reference line R as the specific hydrogen purge degree Hps, the derived specific opening degree As may be set as the modified target opening degree Atr ②. In other words, as illustrated in FIG. 3, while the target hydrogen purge degree Hp remains unchanged, the target opening degree At is increased to the modified target opening degree Atr to adjust the target hydrogen purge degree Hp and the modified target opening degree Atr to be on the backflow reference line R.

In operation S53, the anode gas is purged through the purge valve 50 by the target purge degree Pt, and at the same time, the air pressure control valve 120 may be opened by the modified target opening degree Atr. Accordingly, the hydrogen discharged through the purge valve 50 may be prevented from flowing backwards to the internal space 22 of the stack enclosure 20 along the air discharge line 160. In operation S54, in response to determining in operation S51 that the fuel cell vehicle is driven on a downhill road, the target purge degree Pt may be modified using the backflow diagram illustrated in FIG. 3. In other words, in response to determining that the fuel cell vehicle is driven on a downhill road, while the target opening degree At of the air pressure control valve 120 remains unchanged, the target purge degree Pt of the anode gas is modified, and thus, the backflow of the hydrogen may be prevented.

The method for modifying the target purge degree Pt using the backflow diagram illustrated in FIG. 3 is not particularly limited. For example, in operation S54, after the particular hydrogen purge degree Hps that corresponds to the target opening degree At is derived by inserting the target opening degree At to the backflow reference line R as the particular opening degree As, the derived particular hydrogen purge degree Hps may be set as the modified target hydrogen purge degree Hpr ③, and the modified target purge degree Ptr may be set by inserting the modified target hydrogen purge degree Hpr to Equation (1). In other words, as illustrated in FIG. 3, while the target opening degree At remains unchanged, the target hydrogen purge degree Hp is decreased to the modified hydrogen purge degree Hpr to adjust the modified target hydrogen purge degree Hpr and the target opening degree At to be on the backflow reference line R Thereafter, the modified target purge degree Ptr may be set using the modified target hydrogen purge degree Hpr.

In operation S55, the anode gas may be purged through the purge valve 50 by the modified target purge degree Ptr, and at the same time, the air pressure control valve 120 may be opened by the target opening degree At. Accordingly, the hydrogen discharged through the purge valve 50 may be prevented from flowing backwards to the internal space 22 of the stack enclosure 20 along the air discharge line 160.

In operation S56, after a predetermined reference time period T elapses from operation S55, the anode gas may be purged from the anode 12 through the purge valve 50 by a residual degree Pt-Ptr that corresponds to a difference between the target purge degree Pt and the modified target purge degree Ptr, and at the same time, the air pressure control valve 120 may be opened by the target opening degree At. The reference time period T refers to a time period during which the hydrogen purged in operation S56 and the hydrogen purged in operation S55 are mixed with each other to prevent the hydrogen from flowing backwards to the internal space 22 of the stack enclosure 20. The hydrogen may be purged by the residual degree of the target purge degree Pt through operation S56, to adjust the hydrogen concentration of the anode 12 to a proper level.

Meanwhile, although it has been described in operation S50 that the backflow of the hydrogen may be prevented by modifying any one of the target purge degree Pt and the target opening degree At, the present disclosure is not limited thereto. In other words, in operation 50, the backflow of the hydrogen may be also prevented by modifying the target purge degree Pt and the target opening degree At together ④.

Figure 4:
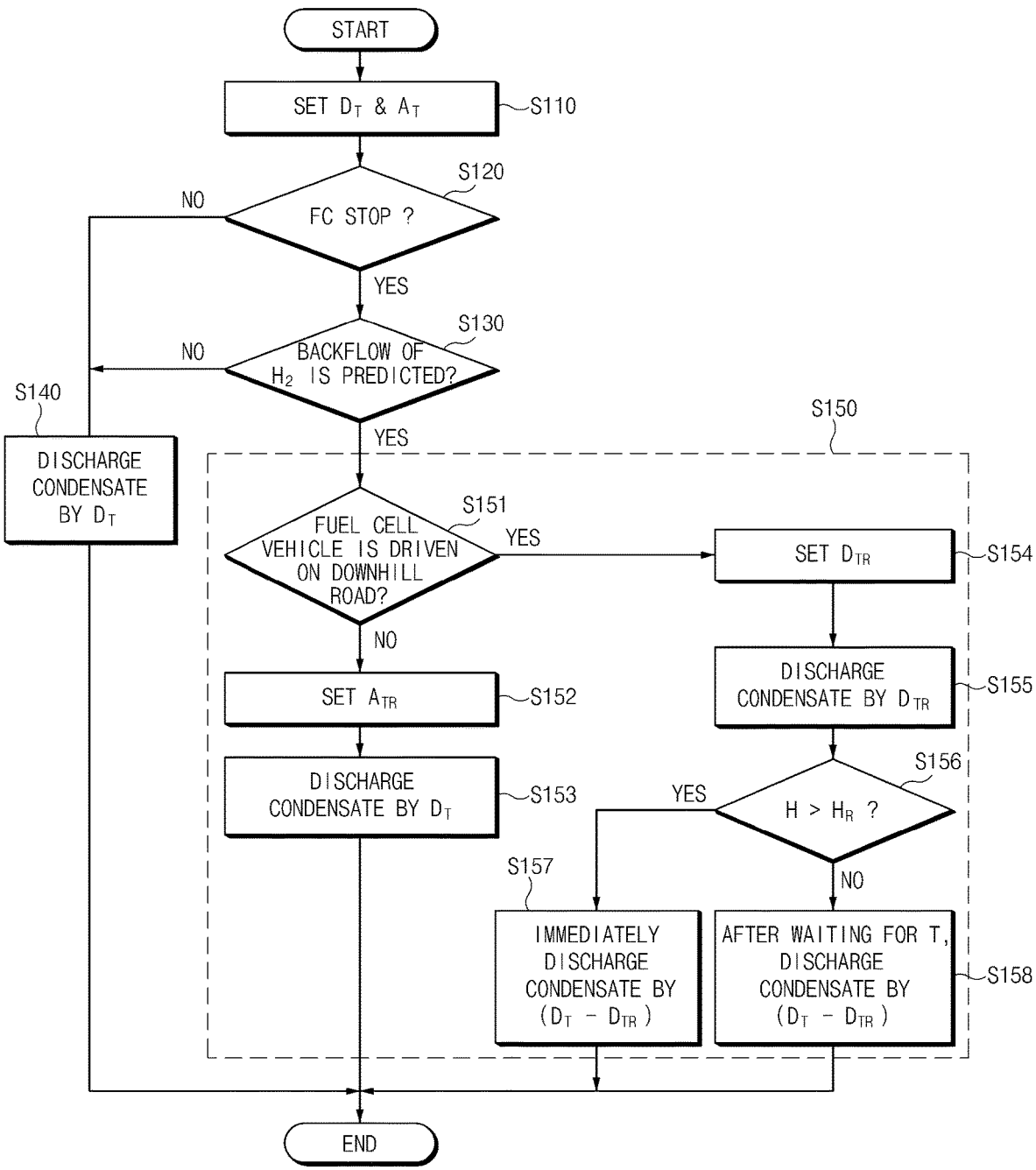
FIG. 4 is a flowchart illustrating a method for controlling a fuel cell vehicle according to a second exemplary embodiment of the present disclosure.
Figure 5:
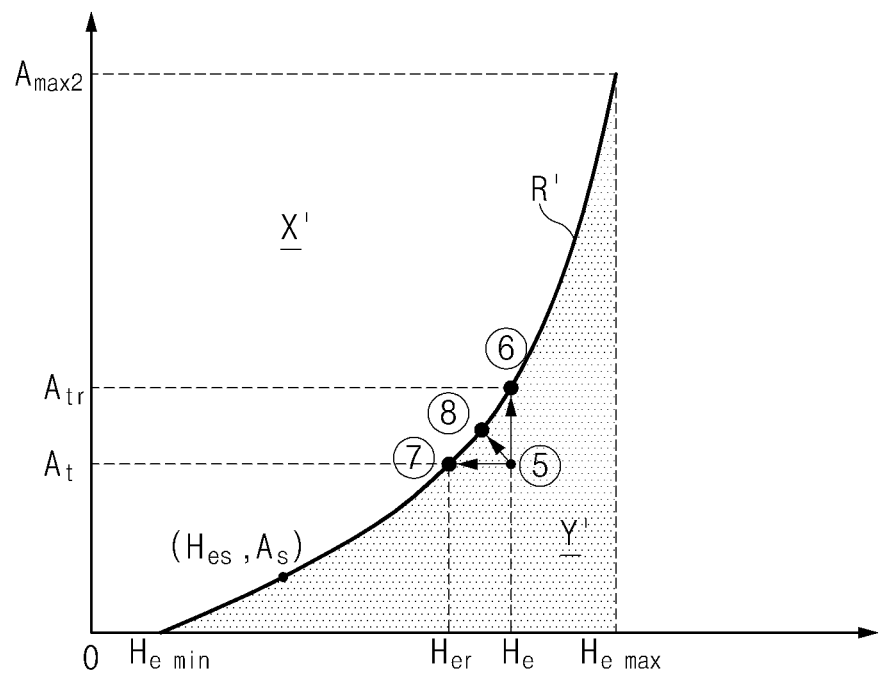
FIG. 5 is a graph illustrating a method for modifying a target discharge degree and a target opening degree to prevent hydrogen from flowing backwards according to an exemplary embodiment of the present disclosure.

FIG. 4 is a flowchart illustrating a method for controlling a fuel cell vehicle according to a second exemplary embodiment of the present disclosure, and FIG. 5 is a graph illustrating a method for modifying a target discharge degree Dt and a target opening degree At to prevent hydrogen from flowing backwards. In a method for controlling a fuel cell vehicle according to a second exemplary embodiment of the present disclosure, when condensate discharging is performed in which the condensate stored in the water trap 60 is discharged through the condensate valve 70, the hydrogen discharged together with the condensate through the condensate valve 70 may be prevented from flowing backwards to the internal space 22 of the stack enclosure 20. For example, referring to FIG. 4, the method for controlling a fuel cell vehicle according to the second exemplary embodiment of the present disclosure may include setting a target discharge degree Dt of the condensate and a target opening degree At of the air pressure control valve 120; in response to determining that the stack 10 is in a power generation stop state, when the condensate is discharged from the water trap 60 based on the target discharge degree Dt and the target opening degree At, determining whether the hydrogen transferred together with the condensate to the air discharge line 160 flows backwards to the stack enclosure 20 connected to an upstream side of the air discharge line 160; in response to determining that the hydrogen does not flow backwards, discharging the condensate based on the target discharge degree Dt and the target opening degree At; and in response to determining that the hydrogen flows backwards, modifying at least one of the target discharge degree Dt and the target opening degree At to a level at which backflow of the hydrogen is prevented, and discharging the condensate from the water trap 60 based on the modified target discharge degree Pt and the modified target opening degree At.

First, in operation S110, the target discharge degree Dt of the condensate and the target opening degree At of the air pressure control valve 120 may be set based on a current state of the fuel cell vehicle. The target discharge degree Dt of the condensate refers to a discharge degree of condensate to be discharged from the water trap 60 through the condensate valve 70 among the condensate stored in the water trap 60. The target discharge degree Dt may be determined based on a water level H of the water trap 60, which is measured by a water level sensor installed in the water trap 60. Since the water trap 60 is connected to the anode 12 through the condensate discharge line, when the condensate is discharged from the water trap 60 by opening the condensate valve 70, the hydrogen circulating in the anode 12 may be discharged together with the condensate through the condensate valve 70. Accordingly, when the condensate is discharged, an amount (hereinafter, referred to as a "target hydrogen discharge degree He") of the hydrogen discharged from the water trap 60 through the condensate valve 70 may be determined based on the target discharge degree Dt, the hydrogen pressure Ah of the anode 12, and an amount Wd of the condensate stored in the water trap 60, as expressed in Equation (2).

$$H_e = f(D_t, A_h, W_d) \qquad \text{Equation 2}$$

The target opening degree At of the air pressure control valve 120 refers to an opening degree of the air pressure control valve 120 when the condensate is discharged. The target opening degree At may be determined based on a hydrogen concentration in the vicinity of an outlet of the air discharge line 160, and the like.

In operation S120, whether a power generation stop mode in which supply of the hydrogen to the anode 12 and supply of the air to the cathode 13 are stopped and thus power generation using the stack 10 is stopped is performed may be determined. Thereafter, as illustrated in FIG. 5, operation S130 may be performed using a backflow diagram indicating a correlation of the target discharge degree Dt, the target opening degree At, and backflow of the hydrogen.

A specific opening degree As of the air pressure control valve 120, which corresponds to a minimum value at which the backflow of the hydrogen may be prevented when the condensate is discharged by a particular discharge degree between a predetermined minimum discharge degree and a predetermined maximum discharge degree of the condensate, may be recorded at the particular discharge degree in the backflow diagram illustrated in FIG. 5. For example, as illustrated in FIG. 3, the backflow diagram includes a backflow reference line R' that indicates coordinate values of a particular hydrogen discharge degree Hes indicating a discharge degree of the hydrogen when the condensate is discharged by the particular discharge degree and the particular opening degree As of the air pressure control valve 120, which corresponds to a minimum value at which the hydrogen may be prevented from flowing backwards to the internal space 22 of the stack enclosure 20 when the hydrogen is discharged by the specific hydrogen discharge degree Hes.

A minimum discharge degree of the condensate refers to a discharge degree of the condensate at which it is determined that the hydrogen does not flow backwards to the internal space 22 of the stack enclosure 20 regardless of the opening degree of the air pressure control valve 120. A "Hemin" illustrated FIG. 3 refers to a minimum hydrogen discharge degree for hydrogen discharged from the anode 12 through the condensate valve 70 when the condensate is discharged by such a minimum discharge degree.

A maximum discharge degree of the condensate refers to a discharge degree of the condensate, which corresponds to a limit point at which the hydrogen may be prevented from flowing backwards to the internal space 22 of the stack enclosure 20 by adjusting an opening degree of the air pressure control valve 120. When the condensate is discharged by a degree that is greater than the discharge degree of the condensate, the hydrogen flows backwards to the internal space 22 of the stack enclosure 20 regardless of the opening degree of the air pressure control valve 120. A "Hemax" illustrated FIG. 5 refers to a maximum hydrogen discharge degree for hydrogen discharged from the anode 12 through the condensate valve 70 when the condensate is discharged by such a maximum discharge degree. A "Amax2" illustrated in FIG. 3 refers to a critical opening degree of the air pressure control valve 120, which corresponds to a minimum value at which the hydrogen may be prevented from flowing backwards when hydrogen is discharged from the anode 12 through the condensate valve 70 by the maximum discharge degree Hemax.

In operation S130, the target hydrogen discharge degree He and the target opening degree At may be analyzed by such a backflow diagram. For example, when coordinates of the target hydrogen discharge degree He and the target opening degree At are on the backflow reference line R' or on the left side of the backflow reference line R', it may be interpreted that both the target discharge degree Dt and the target opening degree At are in proper levels in terms of the prevention of the backflow of the hydrogen. Accordingly, when the coordinates of the target hydrogen purge degree He and the target opening degree At are on the backflow reference line R' or on the left side of the backflow reference line R', when the condensate is discharged through the condensate valve 70 by the target discharge degree Dt, and at the same time, the air pressure control valve 120 is opened by the target opening degree At, it may be determined that the hydrogen discharged from the anode 12 through the condensate valve 70 does not flow backwards to the internal space 22 of the stack enclosure 20 along the air discharge line 160.

For example, when the coordinates of the target hydrogen discharge degree He and the target opening degree At are on the right side of the backflow reference line R' ⑤, it may be interpreted that the target discharge degree Dt is greater than a proper level or the target opening degree At is less than a proper level in terms of the prevention of the backflow of the hydrogen. Accordingly, when the coordinates of the target hydrogen discharge degree He and the target opening degree At are on the right side of the backflow reference line R' ⑤, when the condensate is discharged through the condensate valve 70 by the target discharge degree Dt, and at the same time, the air pressure control valve 120 is opened by the target opening degree At, it may be determined that the hydrogen discharged from the anode 12 through the condensate valve 70 flows backwards to the internal space 22 of the stack enclosure 20 along the humidifier 110, the air discharge line 160, and the like.

For convenience of description, hereinafter, the backflow reference line R' and the left side of the backflow reference line R' in which it is determined that the hydrogen does not flow backwards when the condensate is discharged may be named a non-backflow area X', and the right side of the backflow reference line R' in which it is determined that the hydrogen flows backwards when the condensate is discharged may be named a backflow area Y'.

In operation S140, in response to determining in operation S130 that the coordinates of the target hydrogen discharge degree He and the target opening degree At are in the non-backflow area X', the condensate may be discharged through the condensate valve 70 by the target discharge degree Dt, and at the same time, the air pressure control valve 120 may be opened by the target opening degree At. Thereafter, in operation S150, in response to determining in operation S130 that the coordinates of the target hydrogen discharge degree He and the target opening degree At are in the backflow area Y', at least one of the target discharge degree Dt and the target opening degree At may be modified to adjust the coordinates of the target hydrogen discharge degree He and the target opening degree At to be located in the non-backflow area X'.

For example, operation S150 may include determining whether the fuel cell vehicle is driven on a downhill road (S151); in response to determining that the fuel cell vehicle is not driven on a downhill road, setting a modified target opening degree Atr by modifying the target opening degree At (S152); discharging the condensate from the water trap 60 based on the target discharge degree Dt and the modified target opening degree Atr (S153); in response to determining that the fuel cell vehicle is driven on a downhill road, setting a modified target discharge degree Dtr by modifying the target discharge degree Dt (S154); discharging the condensate from the water trap 60 by the modified target discharge degree Dtr based on the modified target discharge degree Dtr and the target opening degree At (S155); determining whether a water level H of the water trap 60 exceeds a predetermined reference water level Hr, operation S156 being performed after operation S155 (S156); in response to determining that the water level H of the water trap 60 exceeds the reference water level Hr, immediately discharging the condensate from the water trap 60 by a residual degree Dt-Dtr that corresponds to a difference between the target discharge degree Dt and the modified target discharge degree Dtr (S157); and in response to determining that the water level of the water trap is less than the reference water level Hr, after waiting for a predetermined reference time period T, discharging the condensate from the water trap 60 by the residual degree Dt-Dtr that corresponds to a difference between the target discharge degree Dt and the modified target discharge degree Dtr (S158).

In operation S151, whether the fuel cell vehicle is driven on a downhill road may be determined using an inclination sensor mounted within the fuel cell vehicle, and the like. In operation S152, in response to determining in operation S151 that the fuel cell vehicle is not driven on a downhill road, the target opening degree At may be modified using the backflow diagram illustrated in FIG. 5.

The method for modifying the target opening degree At using the backflow diagram illustrated in FIG. 5 is not particularly limited. For example, in operation S152, after the particular opening degree As that corresponds to the target discharge degree Dt may be derived by inserting the target hydrogen discharge degree He to the backflow reference line R' as the specific hydrogen discharge degree Hes ⑥, the derived specific opening degree As may be set as the modified target opening degree Atr. In other words, as illustrated in FIG. 5, while the target discharge degree Dt remains unchanged, the target opening degree At may be increased to the modified target opening degree Atr such that the target hydrogen discharge degree He and the modified target opening degree Atr are on the backflow reference line R'.

In operation S153, the condensate may be discharged through the condensate valve 70 by the target discharge degree Dt, and at the same time, the air pressure control valve 120 may be opened by the modified target opening degree Atr. Accordingly, the hydrogen discharged through the condensate valve 70 may be prevented from flowing backwards to the internal space 22 of the stack enclosure 20 along the humidifier 110, the air discharge line 160, and the like. In operation S154, in response to determining in operation S151 that the fuel cell vehicle is driven on a downhill road, the target discharge degree Dt may be modified using the backflow diagram illustrated in FIG. 5. In other words, in response to determining that the fuel cell vehicle is driven on a downhill road, while the target opening degree At of the air pressure control valve 120 remains unchanged, the target discharge degree Dt of the condensate may be modified, and thus, the backflow of the hydrogen may be prevented.

The method for modifying the target discharge degree Dt using the backflow diagram illustrated in FIG. 5 is not particularly limited. For example, in operation S154, after the specific hydrogen discharge degree Hes that corresponds to the target opening degree At may be derived by inserting the target opening degree At to the backflow reference line R' as the particular opening degree As ⑦, the derived specific hydrogen discharge degree Hes may be set as the modified target hydrogen discharge degree Her, and the modified target discharge degree Dtr may be set by inserting the modified target hydrogen discharge degree Her to Equation (2) in turn. In other words, as illustrated in FIG. 5, while the target opening degree At remains unchanged, the target hydrogen discharge degree He may be decreased to the modified hydrogen discharge degree Her such that the modified target hydrogen discharge degree Her and the target opening degree At are on the backflow reference line R'. Thereafter, the modified target discharge degree Dtr may be set using such a modified target hydrogen discharge degree Her.

In operation S155, the condensate may be discharged from the water trap 60 through the condensate valve 70 by the modified target discharge degree Dtr, and at the same time, the air pressure control valve 120 may be opened by the target opening degree At. Accordingly, the hydrogen discharged through the condensate valve 70 may be prevented from flowing backwards to the internal space 22 of the stack enclosure 20 along the humidifier 110, the air discharge line 160, and the like. In operation 156, whether the water level H of the water trap 60 exceeds the predetermined reference water level Hr may be determined using the water level sensor installed in the water trap 60. The reference water level Hr refers to a water level at which the condensate may be prevented from overflowing to the outside of the water trap 60.

In operation 157, in response to determining in operation 156 that the water level H of the water trap 60 exceeds the reference water level Hr, the condensate may be discharged from the water trap 60 through the condensate valve 70 again by the residual degree Dt-Dtr that corresponds to the difference between the target discharge degree Dt and the modified target discharge degree Dtr. In other words, when the water level H of the water trap 60 exceeds the reference water level Hr, a probability that the condensate overflows to the outside of the water trap 60 is high. Thus, the condensate may be discharged immediately from the water trap 60 by the residual degree Dt-Dtr.

In operation 158, in response to determining in operation 156 that the water level H of the water trap 60 is less than the reference water level Hr, after waiting for the predetermined reference time period T, the condensate may be discharged from the water trap 60 through the condensate valve 70 again by the residual degree Dt-Dtr. The reference time period T refers to a time period during which the hydrogen discharged in operation S158 and the hydrogen discharged in operation S155 are mixed to prevent the hydrogen from flowing backwards to the internal space 22 of the stack enclosure 20. The water level H of the water trap 60 may be adjusted to a proper level by discharging even the residual degree Dt-Dtr of the target discharge degree Dt through operation S158.

Meanwhile, although it has been described in operation S150 that the backflow of the hydrogen may be prevented by modifying any one of the target discharge degree Dt and the target opening degree At, the present disclosure is not limited thereto. In other words, in operation 150, the backflow of the hydrogen may be also prevented by modifying the target discharge degree Dt and the target opening degree At together ⑧.

Figure 6:
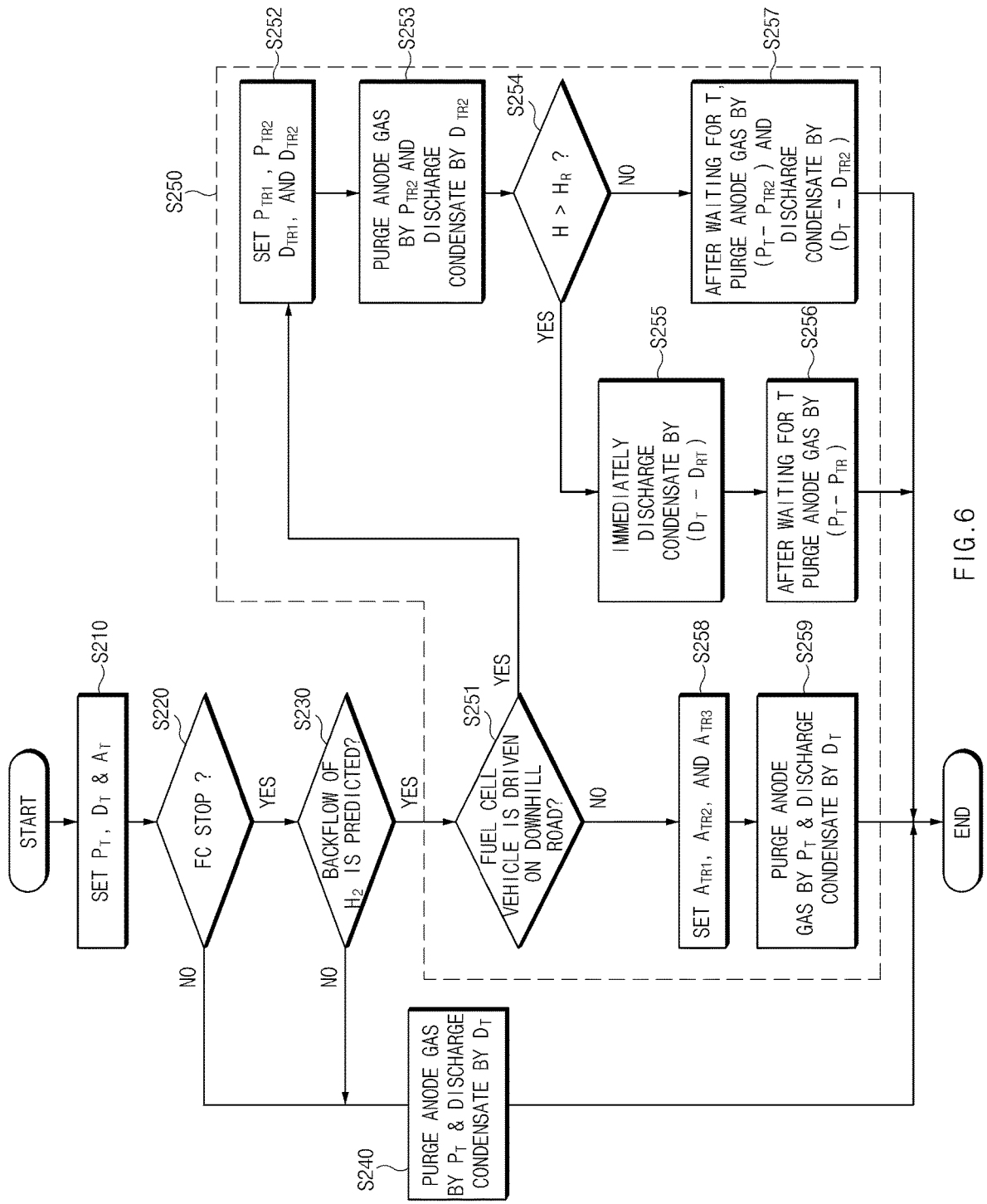
FIG. 6 is a flowchart illustrating a method for controlling a fuel cell vehicle according to a third exemplary embodiment of the present disclosure.
Figure 7:
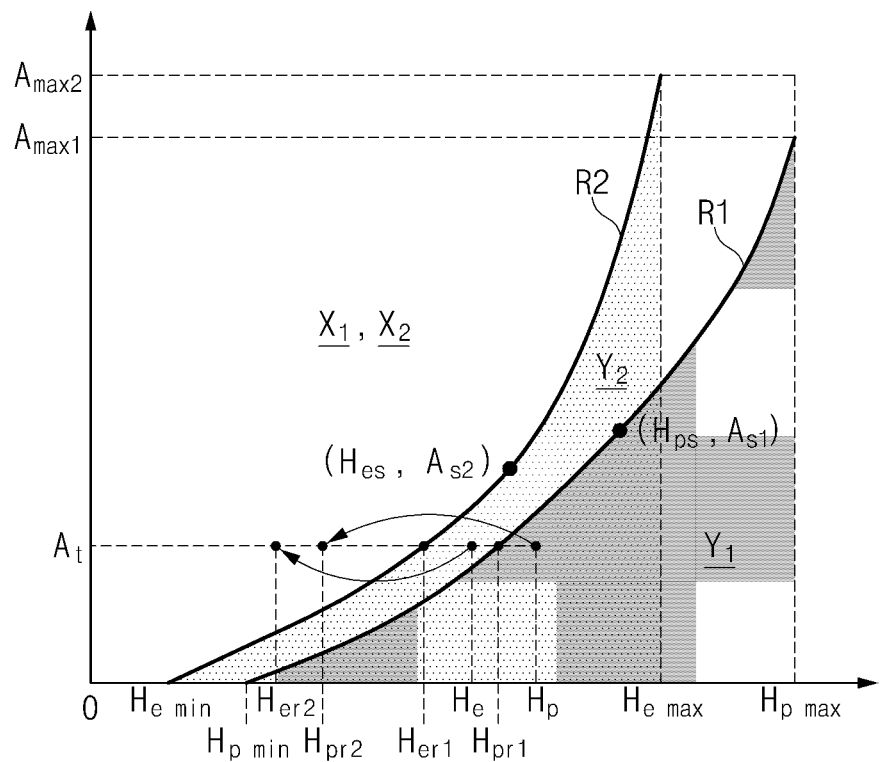
FIG. 7 is a graph illustrating a method for modifying a target opening degree to prevent hydrogen from flowing backwards according to an exemplary embodiment of the present disclosure.
Figure 8:
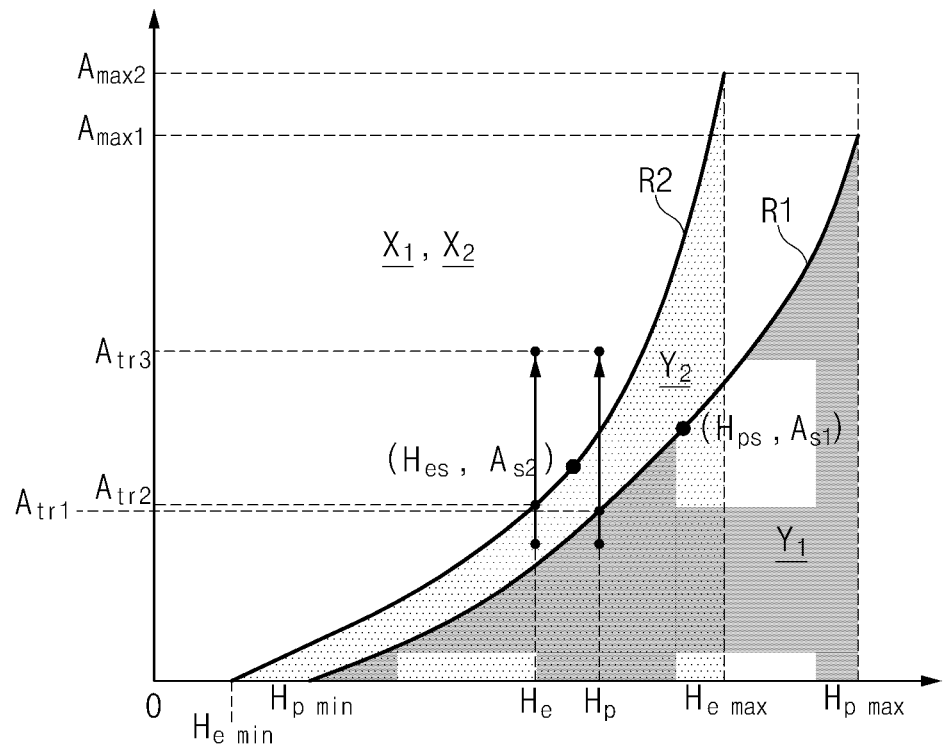
FIG. 8 is a graph illustrating a method for modifying a target purge degree and a target discharge degree to prevent hydrogen from flowing backwards according to an exemplary embodiment of the present disclosure.

FIG. 6 is a flowchart illustrating a method for controlling a fuel cell vehicle according to a third exemplary embodiment of the present disclosure, FIG. 7 is a graph illustrating a method for modifying a target opening degree At to prevent hydrogen from flowing backwards, and FIG. 8 is a graph illustrating a method for modifying a target purge degree Pt and a target discharge degree Dt to prevent hydrogen from flowing backwards.

In a method for controlling a fuel cell vehicle according to a third exemplary embodiment of the present disclosure, when the anode gas is purged and, at the same time, the condensate is discharged, the hydrogen discharged through the purge valve 50 and the condensate valve 70 may be prevented from flowing backwards to the internal space 22 of the stack enclosure 20. For example, referring to FIG. 6, the method for controlling a fuel cell vehicle according to the third exemplary embodiment of the present disclosure may include setting the target purge degree Pt of the anode gas, the target discharge degree Dt of the condensate, and the target opening degree At of the air pressure control valve 120 (S210); determining whether the stack 10 is in a power generation stop state (S220); in response to determining that the stack 10 is in the power generation stop state, when the anode gas is purged from the anode 12 and, at the same time, the condensate is discharged from the water trap 60 based on the target purge degree Pt, the target discharge degree Dt, and the target opening degree At, determining whether the hydrogen transferred to the air discharge line 160 flows backwards to the stack enclosure 20 connected to the upstream side of the air discharge line 160 (S230); in response to determining that the hydrogen does not flow backwards, purging the anode gas and, at the same time, discharging the condensate based on the target purge degree Pt, the target discharge degree Dt, and the target opening degree At (S240); and in response to determining that the hydrogen flows backwards, modifying at least one of the target purge degree Pt, the target discharge degree Dt, and the target opening degree At to a level at which the backflow of the hydrogen is prevented, and purging the anode gas and, at the same time, discharging the condensate based on the modified target purge degree Pt, the modified target discharge degree Dt, and the modified target opening degree At (S250).

In operation S210, the target purge degree Pt of the anode gas, the target discharge degree Dt of the condensate, and the target opening degree At of the air pressure control valve 120 may be set based on a current state of the fuel cell vehicle. Further, in operation S210, the target hydrogen purge degree Hp may be calculated from the target purge degree Pt using Equation (1), and the target hydrogen discharge degree He is calculated from the target discharge degree Dt using Equation (2). In operation S220, whether a power generation stop mode in which supply of the hydrogen to the anode 12 and supply of the air to the cathode 13 are stopped and thus power generation using the stack 10 is stopped is performed may be determined. Thereafter, as illustrated in FIG. 7, operation S230 may be performed using a backflow diagram indicating a correlation of the target purge degree Pt, the target discharge degree Dt, and backflow of the hydrogen.

A first specific opening degree As1 of the air pressure control valve 120, which corresponds to a minimum value at which the backflow of the hydrogen may be prevented when the anode gas is purged by a particular purge degree between a predetermined minimum purge degree and a predetermined maximum purge degree of the anode gas, may be recorded at the particular purge degree in the backflow diagram illustrated in FIG. 7. For example, as illustrated in FIG. 7, the backflow diagram includes a first backflow reference line R1 that indicates coordinate values of a particular hydrogen purge degree Hps indicating a purge degree of the hydrogen when the anode gas is purged by the particular purge degree and the first particular opening degree As1 of the air pressure control valve 120, which corresponds to a minimum value at which the hydrogen may be prevented from flowing backwards to the internal space 22 of the stack enclosure 20 when the hydrogen is purged by the particular hydrogen purge degree Hps.

A "Hpmin" illustrated FIG. 7 refers to a minimum hydrogen purge degree for hydrogen discharged from the anode 12 through the purge valve 50 when the anode gas is purged by the minimum purge degree. A "Hpmax" illustrated FIG. 7 refers to a maximum hydrogen purge degree for hydrogen discharged from the anode 12 through the purge valve 50 when the anode gas is purged by the maximum purge degree. A "Amax1" illustrated in FIG. 7 refers to a critical opening degree of the air pressure control valve 120, which corresponds to a minimum value at which the hydrogen may be prevented from flowing backwards when hydrogen is discharged from the anode 12 through the purge valve 50 by the maximum hydrogen purge degree Hpmax.

A second particular opening degree As2 of the air pressure control valve 120, which corresponds to a minimum value at which the backflow of the hydrogen may be prevented when the condensate is discharged by a particular discharge degree between a predetermined minimum discharge degree and a predetermined maximum discharge degree of the condensate, may be recorded at the particular discharge degree in the backflow diagram illustrated in FIG. 7. For example, as illustrated in FIG. 7, the backflow diagram includes a second backflow reference line R2 that indicates coordinate values of a particular hydrogen discharge degree Hes indicating a discharge degree of the hydrogen when the condensate is discharged by the particular discharge degree and the second specific opening degree As2 of the air pressure control valve 120, which corresponds to a minimum value at which the hydrogen may be prevented from flowing backwards to the internal space 22 of the stack enclosure 20 when the hydrogen is discharged by the particular hydrogen discharge degree Hes.

A "Hemin" illustrated FIG. 7 refers to a minimum hydrogen discharge degree for hydrogen discharged from the anode 12 through the condensate valve 70 when the condensate is discharged by the minimum discharge degree. A "Hemax" illustrated FIG. 7 refers to a maximum hydrogen discharge degree for hydrogen discharged from the anode 12 through the condensate valve 70 when the condensate is discharged by the maximum discharge degree. A "Amax2" illustrated in FIG. 7 refers to a critical opening degree of the air pressure control valve 120, which corresponds to a minimum value at which the hydrogen may be prevented from flowing backwards when hydrogen is discharged from the anode 12 through the condensate valve 70 by such a maximum discharge degree Hemax.

In operation S230, the target hydrogen purge degree Hp, the target hydrogen discharge degree He, and the target opening degree At may be analyzed using such a backflow diagram. For example, coordinates of the target hydrogen purge degree Hp and the target opening degree At are on the first backflow reference line R1 or on the left side of the first backflow reference line R1, and at the same time, coordinates of the target hydrogen discharge degree He and the target opening degree At are on the second backflow reference line R2 or on the left side of the second backflow reference line R2, it may be interpreted that all the target purge degree Pt, the target discharge degree Dt, and the target opening degree At are in proper levels in terms of the prevention of the backflow of the hydrogen. Accordingly, when the anode gas is purged, and at the same time, the condensate is discharged based on the target purge degree Pt, the target discharge degree Dt, and the target opening degree At, it may be determined that the hydrogen discharged from the anode 12 through the purge valve 50 and the condensate valve 70 does not flow backwards to the internal space 22 of the stack enclosure 20 along the humidifier 110, the air discharge line 160, and the like.

For example, when the coordinates of the target hydrogen purge degree Hp and the target opening degree At are on the right side of the first backflow reference line R1, the coordinates of the target hydrogen discharge degree He and the target opening degree At are on the right side of the second backflow reference line R2, or the coordinates of the target hydrogen purge degree Hp and the target opening degree At are on the right side of the first backflow reference line R1, and at the same time, the coordinates of the target hydrogen discharge degree He and the target opening degree At are on the right side of the second backflow reference line R2, it may be interpreted that at least one of the target purge degree Pt and the target discharge degree Dt is greater than a proper level or the target opening degree At is less than a proper level. Accordingly, when the anode gas is purged and, at the same time, the condensate is discharged based on the target purge degree Pt, the target discharge degree Dt, and the target opening degree At, it may be determined that the hydrogen discharged from the anode 12 through the purge valve 50 and the condensate valve 70 flows backwards to the internal space 22 of the stack enclosure 20 along the humidifier 110, the air discharge line 160, and the like.

For convenience of description, hereinafter, the first backflow reference line R1 and the left side of the first backflow reference line R1 in which it is determined that the hydrogen does not flow backwards when the anode gas is purged may be named a first non-backflow area X1, and the right side of the first backflow reference line R1 in which it is determined that the hydrogen flows backwards when the anode gas is purged may be named a first backflow area Y1. Further, the second backflow reference line R2 and the left side of the second backflow reference line R2 in which it is determined that the hydrogen does not flow backwards when the condensate is discharged may be named a second non-backflow area X2, and the right side of the second backflow reference line R2 in which it is determined that the hydrogen flows backwards when the condensate is discharged may be named a second backflow area Y2.

In operation S240, in response to determining in operation S230 that the hydrogen does not flow backwards, the anode gas is purged through the purge valve 50 by the target purge degree Pt, the condensate may be discharged through the condensate valve 70 by the target discharge degree Dt, and at the same time, the air pressure control valve 120 may be opened by the target opening degree At. Thereafter, in operation S250, in response to determining in operation S230 that the hydrogen flows backwards, at least one of the target purge degree Pt, the target discharge degree Dt, and the target opening degree At may be modified to adjust the coordinates of the target hydrogen purge degree Hp and the target opening degree At to be in the first non-backflow area X1, and at the same time, adjust the coordinates of the target hydrogen discharge degree He and the target opening degree At to be in the second non-backflow area X2.

For example, operation S250 may include determining whether the fuel cell vehicle is driven on a downhill road (S251); in response to determining that the fuel cell vehicle is driven on a downhill road, setting a modified target purge degree Ptr by modifying the target purge degree Pt, and at the same time, setting a modified target discharge degree Dtr by modifying the target discharge degree Dt (S252); purging the anode gas from the anode 12 by the modified target purge degree Ptr, and at the same time, discharging the condensate from the water trap 60 by the modified target discharge degree Dtr based on the modified target purge degree Ptr, the modified target discharge degree Dtr, and the target opening degree At (S253); determining whether a water level H of the water step 60 exceeds a predetermined reference water level Hr, operation S254 being performed after operation S253 (S254); in response to determining that the water level H of the water trap 60 exceeds the reference water level Hr, immediately discharging the condensate from the water trap 60 by a residual degree Dt-Dtr that corresponds to a difference between the target discharge degree Dt and the modified target discharge degree Dtr (S255); after waiting for a predetermined reference time period T, purging the anode gas from the anode 12 by a residual degree Pt-Ptr that corresponds to a difference between the target purge degree Pt and the modified target purge degree Ptr, operation S256 being performed after operation S255 (S256); and when it is determined that the water level H of the water trap 60 is not more than the reference water level Hr, purging the anode gas from the anode 12 by the residual degree Pt-Ptr that corresponds to a difference between the target purge degree Pt and the modified target purge degree Ptr, and at the same time, discharging the condensate from the water trap 60 by the residual degree Dt-Dtr that corresponds to a difference between the target discharge degree Dt and the modified target discharge degree Dtr (S257).

In operation S251, whether the fuel cell vehicle is driven on a downhill road may be determined using an inclination sensor provided in the fuel cell vehicle, and the like. In operation S254, in response to determining in operation S251 that the fuel cell vehicle is driven on a downhill road, the target purge degree Pt and the target discharge degree Dt may be modified using the backflow diagram illustrated in FIG. 7. In other words, in response to determining that the fuel cell vehicle is driven on a downhill road, in a state in which the target opening degree At remains unchanged, the target purge degree Pt and the target opening degree At are modified, to prevent the backflow of the hydrogen.

The method for modifying the target purge degree At and the target discharge degree Dt using the backflow diagram illustrated in FIG. 7 is not particularly limited. For example, in operation S252, after the specific hydrogen purge degree Hps that corresponds to the target opening degree At may be derived by inserting the target opening degree At to first the backflow reference line R1 as the first particular opening degree As1, the derived particular hydrogen purge degree Hps may be set as a first modified target hydrogen purge degree Hpr1, and a first modified target purge degree Ptr1 may be set by inserting the first modified target hydrogen purge degree Hpr1 to Equation (1) in turn.

For example, in operation S252, after the particular hydrogen discharge degree Hes that corresponds to the target opening degree At is derived by inserting the target opening degree At to the second backflow reference line R2 as a second particular opening degree As2, the derived specific hydrogen discharge degree Hes may be set as a first modified target hydrogen discharge degree Her1, and a first modified target discharge degree Dtr1 may be set by inserting the first modified target hydrogen discharge degree Her1 to Equation (2) in turn.

Further, in operation S252, to more accurately prevent the backflow of the hydrogen, both coordinates of the modified target purge degree Pt and the target opening degree At and coordinates of the modified target discharge degree Dt and the target opening degree At may be in the first non-backflow area X1 and the second non-backflow area X2 at the same time. For example, as illustrated in FIG. 7, when the second backflow reference line R2 is on the left side of the first backflow reference line R1, both the coordinates of the modified target purge degree Pt and the target opening degree At and the coordinates of the modified target discharge degree Dt and the target opening degree At may be located in the second non-backflow area X2. Accordingly, in operation S252, as illustrated in FIG. 7, after a second modified target hydrogen purge degree Hpr2 and a second modified target hydrogen discharge degree Her2 are set, a second modified target purge degree Ptr2 and a second modified target discharge degree Dtr2 may be set by inserting the second modified target hydrogen purge degree Hpr2 and the second modified target hydrogen discharge degree Her2 to Equation (1) and Equation (2). The second modified target hydrogen purge degree Hpr2 and the second modified target hydrogen discharge degree Her2 may be set by using Equations (3) to (5).

$$\alpha+\beta=1 \quad \text{Equation 3}$$

$$H_{pr2}=\alpha H_{pr1} \quad \text{Equation 4}$$

$$H_{er2}=\beta H_{er1} \quad \text{Equation 5}$$

wherein, "α" refers to a contribution of the purging of the anode gas to the backflow of the hydrogen, and "β" refers to a contribution of the discharging of the condensate to the backflow of the hydrogen. "α" and "β" have a value between 0 to 1 such that both the second modified target hydrogen purge degree Hpr2 and the second modified target hydrogen discharge degree Her2 may be less than the first modified target hydrogen purge degree Hpr1 and the first modified target hydrogen discharge degree Her1.

In operation 253, the anode gas may be purged from the anode 12 through the purge valve by the second modified target hydrogen purge degree Hpr2, the condensate may be discharged from the water trap 60 through the condensate valve 70 by the second modified target discharge degree Dtr2, and at the same time, the air pressure control valve 120 may be opened by the target opening degree At. Accordingly, the hydrogen discharged through the purge valve 50 and the condensate valve 70 may be prevented from flowing backwards to the internal space 22 of the stack enclosure 20 along the humidifier 110, the air discharge line 160, and the like.

In operation 254, whether the water level H of the water trap 60 exceeds the predetermined reference water level Hr may be determined using the water level sensor installed in the water trap 60. In operation 255, in response to determining in operation 254 that the water level H of the water trap 60 exceeds the reference water level Hr, the condensate may be discharged immediately from the water trap 60 through the condensate valve 70 again by a residual degree Dt-Dtr2 that corresponds to a difference between the target discharge degree Dt and the second modified target discharge degree Dtr2.

In operation S256, after waiting for a predetermined reference time period T from operation S255, the anode gas may be purged from the anode 12 through the purge valve 50 again by a residual degree Pt-Ptr2 that corresponds to a difference between the target purge degree Pt and the second modified target purge degree Ptr2. In operation 257, in response to determining in operation S25 that the water level H of the water trap 60 is less than the reference water level Hr, after waiting for the predetermined time period T, the anode gas may be purged from the anode 12 through the purge valve again by a residual degree that corresponds to a difference between the target purge degree Pt and the second modified target purge degree Ptr2, and at the same time, the condensate may be discharged from the water trap 60 through the condensate valve 70 again by a residual degree corresponding to a difference between the target discharge degree Dt and the second modified target discharge degree Dtr2.

Meanwhile, operation S250 may further include in response to determining that the fuel cell vehicle is not driven on a downhill road, setting a modified target opening degree Atr by modifying the target opening degree At (S258), and purging the anode gas from the anode 12 by the target purge degree Pt, and at the same time, discharging the condensate from the water trap 60 by the target discharge degree Dt, based on the target discharge degree Dt and the modified target opening degree Atr. In operation S258, the target opening degree At may be modified using the first backflow reference line R1 and the second backflow reference line R2.

For example, in operation S258, as illustrated in FIG. 8, after the first particular opening degree As1 that corresponds to the target purge degree Pt is derived by inserting the target hydrogen purge degree Hp to the first backflow reference line R1 as the particular hydrogen purge degree Hps, the derived the first specific opening degree As1 may be set as the first modified target opening degree Atr1. For example, in operation S258, after the second particular opening degree As2 that corresponds to the target discharge degree Dt is derived by inserting the target hydrogen discharge degree He to the second backflow reference line R2 as the specific hydrogen discharge degree Hes, the derived second particular opening degree As2 may be set as the modified second target opening degree Atr2.

Further, in operation S252, to more accurately prevent the backflow of the hydrogen, both coordinates of the target purge degree Pt and the modified target opening degree At and coordinates of the target discharge degree Dt and the modified target opening degree At may be in the first non-backflow area X1 and the second non-backflow area X2 at the same time. For example, when the second backflow reference line R2 is on the upper side of the first backflow reference line R1, both the coordinates of the target purge degree Pt and the modified target opening degree At and the coordinates of the target discharge degree Dt and the modified target opening degree At may be in the second non-backflow area X2. Accordingly, in operation S258, a third modified target opening degree Atr3 may be set using the first modified target opening degree Atr1 and the second modified target opening degree Atr2. The third modified target opening degree Atr3 may set using Equation (6).

$$A_{tr3}=\gamma \text{MAX}(A_{tr1},A_{tr2}) \quad \text{Equation 6}$$

wherein, "γ" indicates an influence of complex implement of the purging of the anode gas and the discharging of the condensate on the backflow of the hydrogen. In Equation (6), the third modified target opening degree Atr3 may be calculated by multiplying a greater value among the first modified target opening degree Atr1 and the second modified target opening degree Atr2 by "γ". Further, "γ" has a greater value than 1 to adjust both coordinates of the target purge degree Pt and the third modified target opening degree Atr3 and coordinates of the target discharge degree Dt and the third modified target opening degree Atr3 to be in the second non-backflow area X2.

In operation 259, the anode gas may be purged from the anode 12 through the purge valve by the target purge degree Pt, the condensate may be discharged from the water trap 60 through the condensate valve 70 by the target discharge degree Dt, and at the same time, the air pressure control valve 120 may be opened by the third modified target opening degree Atr3. Accordingly, the hydrogen discharged through the purge valve 50 and the condensate valve 70 may be prevented from flowing backwards to the internal space 22 of the stack enclosure 20 along the humidifier 110, the air discharge line 160, and the like. Meanwhile, although it has been described in operation S250 that the backflow of the hydrogen may be prevented by modifying the target purge degree Pt and the target opening degree At or by modifying the target opening degree At, the present disclosure is not limited thereto. In other words, in operation 250, the backflow of the hydrogen may be prevented by modifying the target purge degree Pt, the target discharge degree Dt, and the target opening degree At together.

A method for controlling a fuel cell system according to the present disclosure has the following effects.

First, the present disclosure may prevent hydrogen discharged through a purge valve and a condensate valve from flowing backwards to a stack enclosure when a gas circulating in an anode is purged through the purge valve, and when condensate stored in a water trap is discharged through a condensate valve.

Second, the present disclosure may determine whether the hydrogen flows backwards using a backflow diagram without requiring uncoupling and coupling of a stack enclosure and a stack, and thus, a time consumed for uncoupling and coupling the stack enclosure and the stack, and a secondary failure may be prevented due to the uncoupling and the coupling of the stack enclosure and the stack.

The above description is merely illustrative description of the technical spirit of the present disclosure, and various modifications and deformations may be made by those skilled in the art to which the present disclosure pertains without departing from the essential feature of the present disclosure.

Thus, the exemplary embodiments that are disclosed in the present disclosure are not for limiting but for describing the technical spirit of the present disclosure, and the scope of the technical spirit of the present disclosure is not limited by the exemplary embodiments. The protection scope of the present disclosure should be interpreted by the appended claims and all the technical spirit corresponding to the equivalents thereof should be interpreted to be included in the scope of a right of the present disclosure.

What is claimed is:

1. A method for controlling a fuel cell vehicle including a condensate valve installed in a condensate discharge line through which condensate stored in a water trap is transferred to an air discharge line through which humid air discharged from a cathode is discharged to the outside, and an air pressure control valve installed in the air discharge line, the method comprising:
setting, by a controller, a target discharge degree of the condensate and a target opening degree of the air pressure control valve;
determining, by the controller, whether a fuel cell stack is in a power generation stop state;
in response to determining that the fuel cell stack is in the power generation stop state, when the condensate is discharged from the water trap based on the target discharge degree and the target opening degree, determining, by the controller, whether hydrogen transferred to the air discharge line flows backwards to a stack enclosure connected to an upstream side of the air discharge line; and
in response to determining that the hydrogen flows backwards, modifying at least one of the target discharge degree and the target opening degree to a level at which the backflow of the hydrogen is prevented, and discharging, by the controller, the condensate from the water trap based on the target discharge degree and the target opening degree.

2. The method of claim 1, wherein the determining of whether hydrogen transferred to the air discharge line flows backwards is performed using a backflow diagram that indicates a correlation of the target discharge degree, the target opening degree, and the backflow of the hydrogen.

3. The method of claim 2, wherein when the condensate is discharged by a particular discharge degree between a predetermined minimum discharge degree and a predetermined maximum discharge degree, a particular opening degree of the air pressure control valve, which corresponds to a minimum value at which the backflow of the hydrogen is prevented, is recorded at the particular discharge degree in the backflow diagram, and when the target discharge degree and the target opening degree are in a predetermined backflow area as a result of analyzing the target discharge degree and the target opening degree using the backflow diagram, the hydrogen is determined to be flowing backwards.

4. The method of claim 3, wherein the at least one of the target discharge degree and the target opening degree is modified to adjust the target discharge degree and the target opening degree to be in a predetermined non-backflow area based on the backflow diagram.

5. The method of claim 4, wherein the modification of at least one of the target discharge degree and the target opening degree includes:
determining, by the controller, whether the fuel cell vehicle is driven on a downhill road;
in response to determining that the fuel cell vehicle is not driven on a downhill road, deriving, by the controller, the particular opening degree that corresponds to the target discharge degree by inserting the target discharge degree to the backflow diagram as the particular discharge degree, and setting the derived particular opening degree as a modified target opening degree; and
discharging, by the controller, the condensate from the water trap based on the target discharge degree and the modified target opening degree.

6. The method of claim 5, further comprising:
deriving, by the controller, the particular discharge degree that corresponds to the target opening degree by inserting the target opening degree to the backflow diagram as the particular opening degree, and then setting the derived specific discharge degree as a modified target discharge degree; and
discharging, by the controller, the condensate from the water trap by the modified target discharge degree based on the modified target discharge degree and the target opening degree.

7. The method of claim 6, further comprising:
determining, by the controller, whether a water level of the water trap exceeds a predetermined reference water level;
in response to determining that the water level of the water trap exceeds the predetermined reference water level, immediately discharging, by the controller, the condensate again by a residual degree that corresponds to a difference between the target discharge degree and the modified target discharge degree; and
in response to determining that the water level of the water trap is less than the predetermined reference water level, after waiting for a predetermined reference time period, discharging, by the controller, the condensate from the water trap again by the residual degree.

* * * * *